(12) United States Patent
De Lucas et al.

(10) Patent No.: US 9,542,193 B2
(45) Date of Patent: Jan. 10, 2017

(54) MEMORY ADDRESS COLLISION DETECTION OF ORDERED PARALLEL THREADS WITH BLOOM FILTERS

(71) Applicant: Intel Corporation, Santa Clara, CA (US)

(72) Inventors: Enrique De Lucas, Arganda del Rey (ES); Pedro Marcuello, Barcelona (ES); Oren Ben-Kiki, Tel-Aviv (IL); Ilan Pardo, Ramat-Hasharon (IL); Yuval Yosef, Hadera (IL)

(73) Assignee: Intel Corporation, Santa Clara, CA (US)

( * ) Notice: Subject to any disclaimer, the term of this patent is extended or adjusted under 35 U.S.C. 154(b) by 581 days.

(21) Appl. No.: 13/730,704

(22) Filed: Dec. 28, 2012

(65) Prior Publication Data

US 2014/0189712 A1    Jul. 3, 2014

(51) Int. Cl.
*G06F 9/38*  (2006.01)

(52) U.S. Cl.
CPC .......... *G06F 9/3851* (2013.01); *G06F 9/3834* (2013.01); *G06F 9/3857* (2013.01)

(58) Field of Classification Search
None
See application file for complete search history.

(56) References Cited

U.S. PATENT DOCUMENTS

| 4,943,915 | A | 7/1990 | Wilhelm et al. |
| 5,890,010 | A | 3/1999 | Nishigami |
| 6,105,127 | A | 8/2000 | Kimura et al. |
| 6,397,240 | B1 | 5/2002 | Fernando |
| 6,944,746 | B2 | 9/2005 | So |
| 7,200,741 | B1 | 4/2007 | Mine |
| 7,302,627 | B1 | 11/2007 | Mimar |
| 7,765,388 | B2 | 7/2010 | Barrett et al. |
| 3,063,907 | A1 | 11/2011 | Lippincott et al. |
| 8,190,863 | B2 | 5/2012 | Fossum et al. |
| 8,230,442 | B2 | 7/2012 | Aho et al. |
| 8,424,018 | B2 | 4/2013 | Aho et al. |
| 8,776,084 | B2 | 7/2014 | Aho et al. |
| 9,015,443 | B2 | 4/2015 | Aho et al. |
| 9,053,025 | B2 | 6/2015 | Ben-Kiki et al. |
| 2001/0042210 | A1 | 11/2001 | Blaker et al. |
| 2002/0004904 | A1 | 1/2002 | Blaker et al. |

(Continued)

OTHER PUBLICATIONS

Pereira, "Reproducible User-Level Simulation of Multi-Threaded Workloads", 2007 (no further date).*

(Continued)

*Primary Examiner* — William B Partridge
(74) *Attorney, Agent, or Firm* — Nicholson De Vos Webster & Elliott, LLP

(57) ABSTRACT

A semiconductor chip is described having a load collision detection circuit comprising a first bloom filter circuit. The semiconductor chip has a store collision detection circuit comprising a second bloom filter circuit. The semiconductor chip has one or more processing units capable of executing ordered parallel threads coupled to the load collision detection circuit and the store collision detection circuit. The load collision detection circuit and the store collision detection circuit is to detect younger stores for load operations of said threads and younger loads for store operations of said threads.

4 Claims, 12 Drawing Sheets

(56) References Cited

U.S. PATENT DOCUMENTS

| | | | |
|---|---|---|---|
| 2003/0208665 A1* | 11/2003 | Peir | G06F 9/383 |
| | | | 711/169 |
| 2004/0215444 A1 | 10/2004 | Patel et al. | |
| 2004/0227763 A1 | 11/2004 | Wichman et al. | |
| 2005/0257186 A1 | 11/2005 | Zilbershlag | |
| 2006/0288193 A1 | 12/2006 | Hsu | |
| 2007/0226464 A1 | 9/2007 | Chaudhry et al. | |
| 2008/0052532 A1 | 2/2008 | Akkar et al. | |
| 2008/0104425 A1 | 5/2008 | Gunther et al. | |
| 2008/0162889 A1* | 7/2008 | Cascaval | G06F 9/3834 |
| | | | 712/216 |
| 2009/0024836 A1 | 1/2009 | Shen et al. | |
| 2009/0150722 A1 | 6/2009 | Reid et al. | |
| 2009/0198972 A1* | 8/2009 | Nystad | G06F 9/383 |
| | | | 712/220 |
| 2010/0058356 A1 | 3/2010 | Aho et al. | |
| 2010/0332901 A1 | 12/2010 | Nussbaum et al. | |
| 2011/0145778 A1 | 6/2011 | Chen | |
| 2012/0023314 A1 | 1/2012 | Crum et al. | |
| 2012/0124588 A1 | 5/2012 | Sinha et al. | |
| 2012/0166777 A1 | 6/2012 | McLellan et al. | |
| 2012/0311360 A1 | 12/2012 | Balasubramanian et al. | |
| 2012/0331310 A1 | 12/2012 | Burns et al. | |
| 2013/0054871 A1 | 2/2013 | Lassa | |
| 2013/0166516 A1* | 6/2013 | Reid | G06F 9/30072 |
| | | | 707/690 |
| 2014/0189300 A1 | 7/2014 | Pardo et al. | |
| 2014/0189317 A1 | 7/2014 | Ben-Kiki et al. | |
| 2014/0189332 A1 | 7/2014 | Ben-Kiki et al. | |
| 2014/0189333 A1 | 7/2014 | Ben-Kiki et al. | |

OTHER PUBLICATIONS

Dharmapurikar et al, "Design and Implementation of a String Matching System for Network Intrusion Detection using FPGA-based Bloom Filters", 2004 (no further date).*
Office action from U.S. Appl. No. 13/729,915, mailed Jul. 23, 2015, 17 pages.
Final Office action from U.S. Appl. No. 13/729,915, mailed Dec. 2, 2015, 20 pages.
Notice of Allowance from U.S. Appl. No. 13/729,915, mailed Feb. 17, 2016, 8 pages.
PCT/US2013/046863 Notification Concerning Transmittal of International Preliminary Report on Patentability, mailed Jul. 9, 2015, 6 pages.
PCT/US2013/046863 Notification Concerning Transmittal of the International Search Report and the Written Opinion of the International Searching Authority, mailed Aug. 28, 2013, 9 pages.
PCT/US2013/048694 Notification Concerning Transmittal of International Preliminary Report on Patentability, mailed Jul. 9, 2015, 6 pages.
PCT/US2013/048694 Notification Concerning Transmittal of the International Search Report and the Written Opinion of the International Searching Authority, mailed Sep. 30, 2013, 9 pages.
Office action from U.S. Appl. No. 13/730,719, mailed May 13, 2015, 10 pages.
Final Office action from U.S. Appl. No. 13/730,719, mailed Dec. 15, 2015, 9 pages.
L. Ceze et al., "Bulk Disambiguation of Speculative Threads in Multiprocessors," Proc. 33th Ann. Int'l Symp. Computer Architecture (ISCA '06), pp. 227-238, May 2006.

* cited by examiner

MEMORY ADDRESS COLLISION DETECTION OF ORDERED PARALLEL THREADS WITH BLOOM FILTERS

FIELD OF INVENTION

The field of invention pertains to computing systems, generally, and, more specifically, to memory address collision detection of ordered parallel threads with bloom filters.

BACKGROUND

Bloom filters are a special type of data structure that can be used to indicate whether a specific data pattern has been previously observed. Basic operation of a bloom filter is depicted in FIG. 1.

As observed in FIG. 1a, an input value 100 (e.g., a plurality of bits) is presented to the bloom filter 101. The input value 100 is then used as an input to N different hash functions 102_1 to 102_N. The output of each hash function corresponds to a location in a data store 103. Thus, the presentation of the input value 101 generates the identity of N different locations in the data store 103.

As observed in FIG. 1b, each of the N different locations is then "looked up" from the data store 103. In a traditional implementation, each location in the data store keeps one bit of information (a P bit). The data store is originally initialized with all such bits being set to zero. Assuming input value 100 represents the first input value presented to the bloom filter 101 after its initialization, the lookup of the N different locations will produce N zeros (i.e., each looked up position in the data store 103 will present a zero). The bloom filter then proceeds to write a value of 1 into each of the N locations of the data store 103. In this case, all N locations will flip their storage from a 0 to a 1.

FIG. 1c represents the bloom filter at some later time when the same value 100 is again presented to the bloom filter 101. Execution of the N hash functions 102_1 through 102_N will cause the same N locations as previously identified to be looked up from the data store 103. This time, however, all N bits that are looked up will be equal to one (having been written into that state at the completion of the operation of FIG. 1b). All looked up bits being set equal to one signifies that the input value has been presented to the bloom filter previously.

Thus, if there is some sensitivity to the fact that the same value has appeared previously, the bloom filter 101 can be used to identify whether or not a particular value has appeared before. According to the mathematical properties of a traditional bloom filter, it is possible that a lookup of N bits will yield all ones when in fact that input has not been presented before ("false positive"). However, a traditional bloom filter will not yield anything other than all ones if in fact the input value has been presented before (i.e., false negatives are not possible).

FIGURES

The present invention is illustrated by way of example and not limitation in the figures of the accompanying drawings, in which like references indicate similar elements and in which.

DETAILED DESCRIPTION

Figure 2:
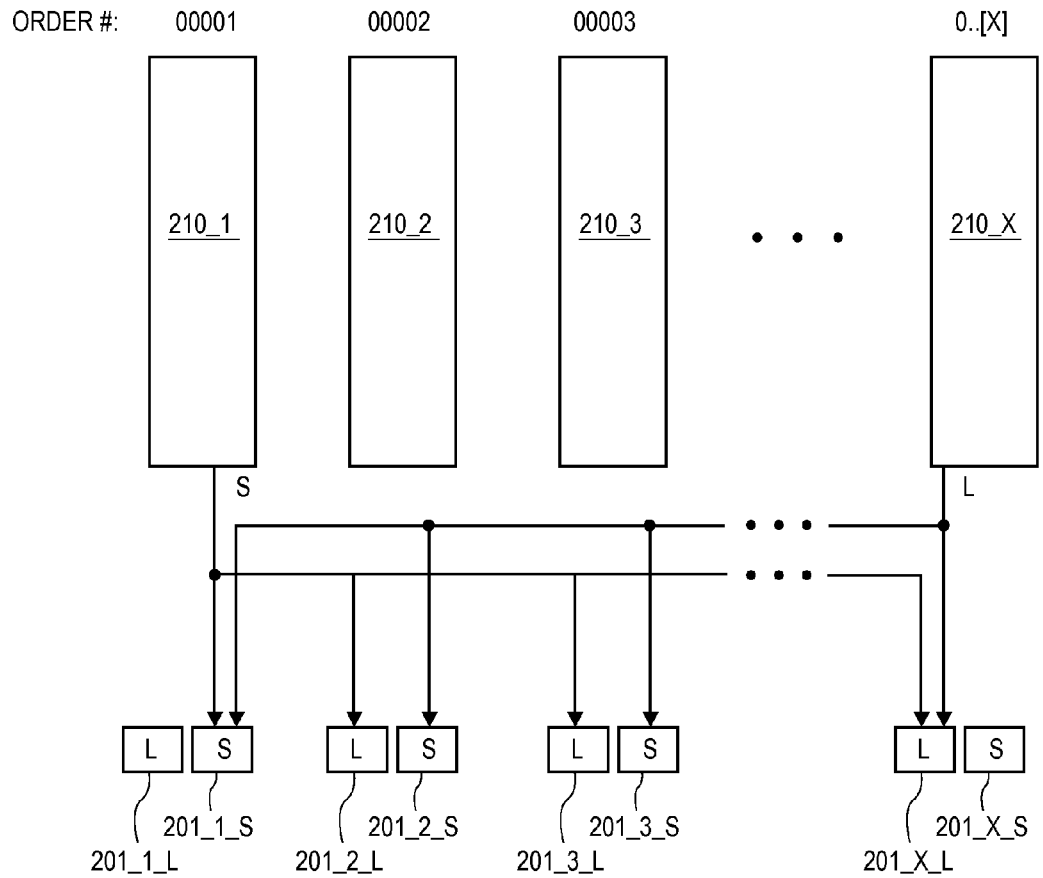
FIG. 2 shows a prior approach for detecting memory address collisions.

FIG. 2 shows a depiction of the use of bloom filters for a multi-threaded application where the order at which data is committed for the various threads is to be controlled. As is understood in the art, a thread is a single stream of instructions ("instruction sequence"). Underlying hardware resources are capable of processing multiple threads concurrently or even simultaneously (either of which may be referred to as "parallel" execution and the like). In certain situations there may be a need or desire to control the order at which data from the different parallel threads are committed.

FIG. 2 shows an embodiment where there are X parallel threads 210_1 through 210_X. Each of the threads has an "order number" with thread 210_1 having the lowest order number and thread 210_X having the highest order number. Here, it is desired that the results of lower ordered threads should be committed before higher ordered threads. In a common situation it is presumed that the threads are operating in isolation. That is, the threads are presumed to operate on different data sets with little or no overlap between them. If there is any overlap it is presumed to be minimal or otherwise acceptable to execute the threads in parallel on the belief that there will be few if any "collisions" where two different threads operate on the same data. Even if two threads operate on the same data, however, it will be permitted so long as a lower ordered thread operates on the data before a higher ordered thread.

FIG. 2 shows a pair of bloom filters 202_1_L/S through 202_X_L/S allocated for each thread 210_1 through 210_X. Each bloom filter pair is used to track the memory addresses of the memory accesses made by its respective thread. A first bloom filter of a pair is used to track loads (L) and a second bloom filter of a pair is used to track stores (S). For example, the "load" bloom filter 202_1_L is used to track the memory addresses of the memory loads made by thread 210_1, the "store" bloom filter 202_2_S is used to track the memory addresses of the memory stores made by thread 210_2, etc. Thus, if thread 202_1 performs a load at a particular memory address, the memory address is presented to the load bloom filter 202_1_L as an input value. Consistent with the discussion of FIG. 1, bloom filter 202_1_L essentially records the existence of the specific load address by ensuring that a 1 is written into each data store location identified by way of the multiple hashing algorithms performed on the address.

According to the operation of the system of FIG. 2, whenever a thread seeks to perform a store operation it not only presents the memory address to its own store bloom filter to record its existence if newly observed, but also, presents the memory address to the load bloom filters of all higher number ("younger") threads. For example, if thread 210_1 seeks to store a data item it not only presents the address of the data item to bloom filter 202_1_S but also each of load bloom filters 202_2_L through 202_X_L. If any of bloom filters 202_2_L through 202_X_L indicate that a higher ordered thread has read from the address previously an error condition is flagged because the younger thread did not wait to load the older (lower ordered) data that is being stored.

Likewise, if a thread seeks to load information, it not only provides the address for the load operation to its own load bloom filter but also provides the address to the store bloom filters of its lesser ordered (older) parallel threads. If any of the store bloom filters of the younger threads indicate that the address had previously been used for a load operation an error flag is raised because the younger thread may potentially read incorrect data since it did not wait for the earlier store operation.

For simplicity FIG. 2 only shows the logic for the two extreme threads (oldest thread 210_1 and youngest thread 210_X). A full depiction would show similarly designs for each of the intermediate threads 210_2 through 210_X−1.

A problem with this approaches is the inefficiency associated with all the bloom filters that need be instantiated as well as the propagation cost and overhead of accessing a large number of such filters for any particular load or store operation by a thread.

Figure 3:
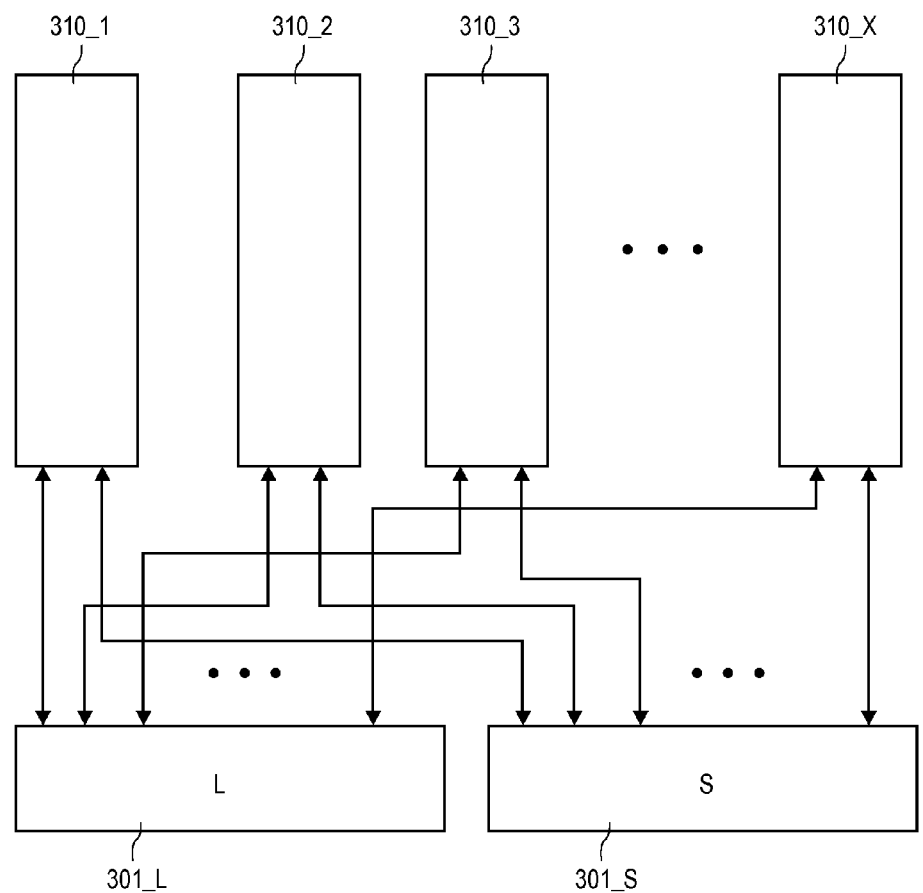
FIG. 3 shows an improved approach for detecting memory address collisions.

FIG. 3 shows an improved approach. As observed in FIG. 3 there is only one load bloom filter 301_L and only one store bloom filter 301_S for the set of parallel threads 310_1 through 310_X. The load bloom filter 301_L keeps track of the load operation addresses made by the set of parallel threads 310_1 through 310_X. The store bloom filter 301_S keeps track of the store operation addresses made by the set of parallel threads 310_1 through 310_X.

Figure 1A:
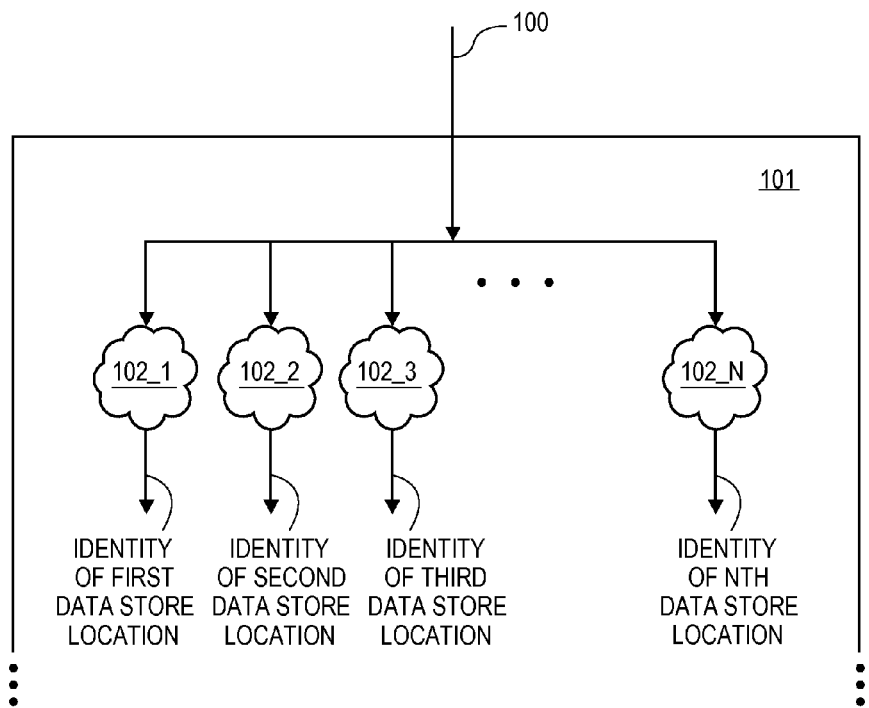
FIGS. 1a, 1b and 1c shows a bloom filter.
Figure 1B:
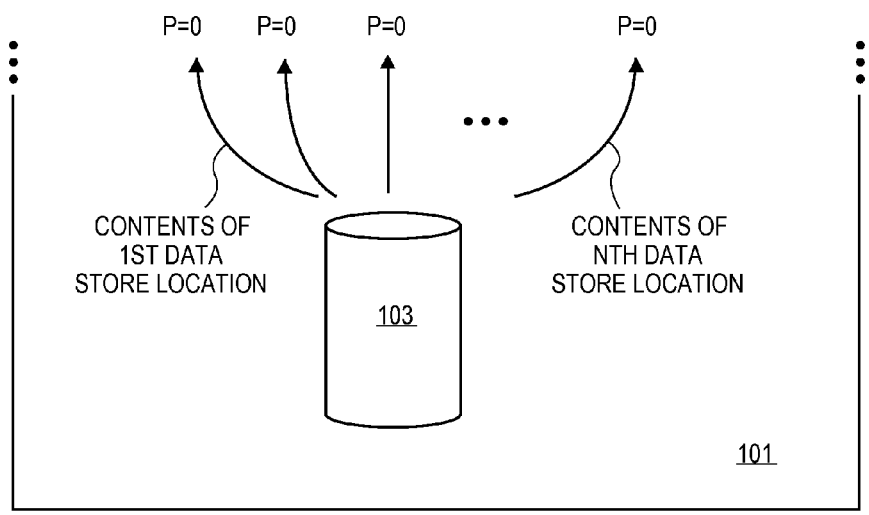
Figure 1C:
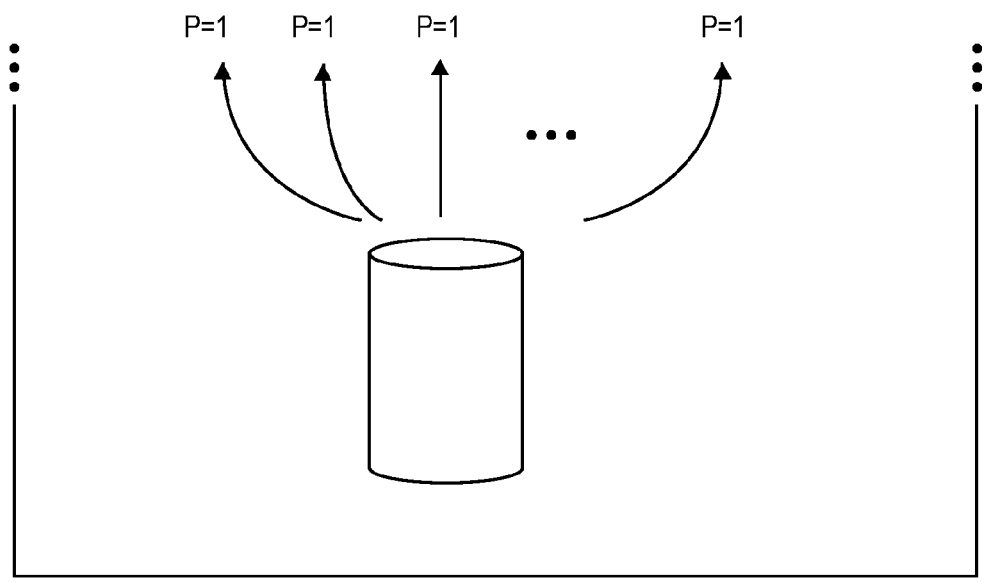

The individual storage elements within the respective data stores of both bloom filters 301_L, 301_S are expanded to store more than one bit (here, recall from the discussion of FIG. 1 that the data store storage element of a traditional bloom filter only stores one bit to indicate whether it has been accessed before). As explained in more detail below, the expanded storage per location is used to store the numerical order of the highest ordered (youngest) thread that has accesses the storage location.

FIGS. 4a through 4d show an example for a load operation by one thread from a set of parallel threads. As observed in FIG. 4a there are X parallel threads 410_1 through 410_X. At time T1 thread 410_7 attempts a load operation and, as part of the load operation, forwards the address 400 of the load operation to both the load bloom filter 401_L and the store bloom filter 401_S.

Figure 4A:
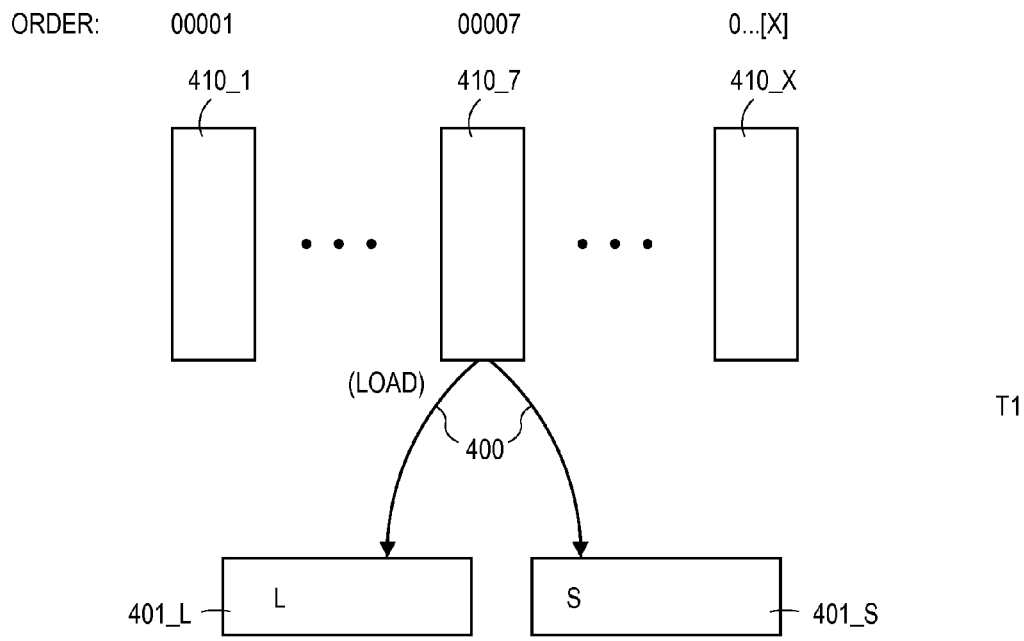
FIGS. 4a through 4d show operation for a load.
Figure 4B:
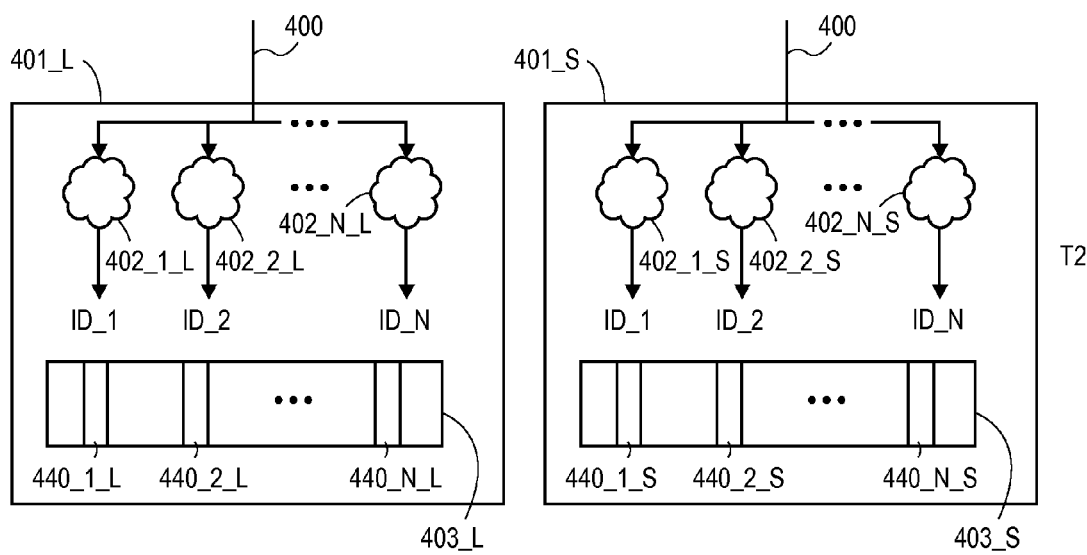

Internal to each bloom filter, at time T2 as observed in FIG. 4b, N hash functions 402_1_L/S through 402_N_L/S are performed on the load address 400. The results of the hash functions correspond to N identifiers of N different storage locations 440_1_L/S, 440_2_L/S, 440_3_L/S, . . . 440_N_L/S within the respective data store 403_L/S of each of the bloom filters 401_L and 401_S. Each data store is designed to have more than N storage locations.

Figure 4C:
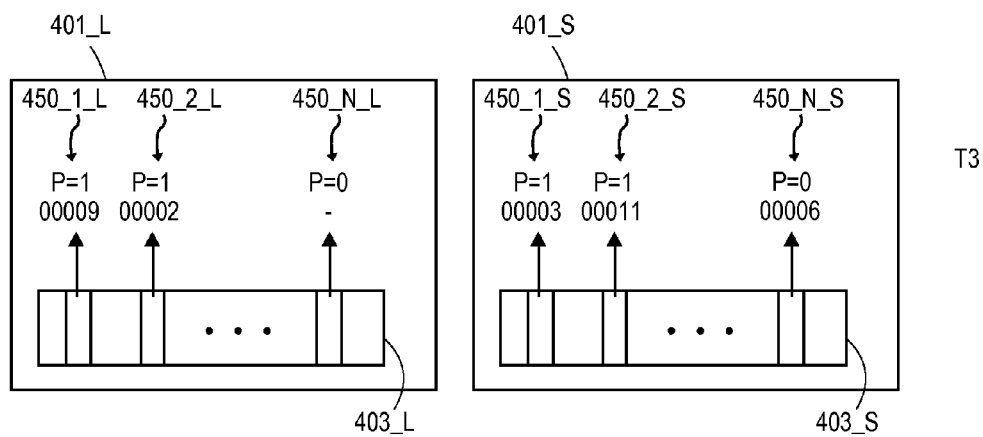

At time T3, as observed in FIG. 4c, the contents 450_1_L/S through 450_N_L/S of the N different storage locations ("resultants") are read from the respective data stores 403_L/S. Here the contents are observed to include not only the aforementioned P bit that indicates whether the location has been accessed before, but also, the "order number" of the highest ordered thread that has accessed it if so. Here, thread 410_1 is provided order number 00001, thread 410_2 is provided order number 00002, etc.

The P bit of each resultant 450_1_L/S through 450_N_L/S is analyzed to see if any P bits are set to 0. If any P bits of a particular bloom filter are set to zero the memory address has not been previously presented to that bloom filter. In that case, an operation of the type represented by the bloom filter has not yet been attempted at the address 400 provided by the accessing thread 401_7.

In the present example, note that resultant 450_N_L of the load bloom filter 401_L has a P bit=0 which therefore indicates that a load operation has not yet been performed at memory address 400 by the set of parallel threads. By contrast, all P bits in the resultant 450_1_S through 450_N_S of the store bloom filter 401_S are set equal to 1. As such, a store operation has been performed before at address 400.

Figure 4D:
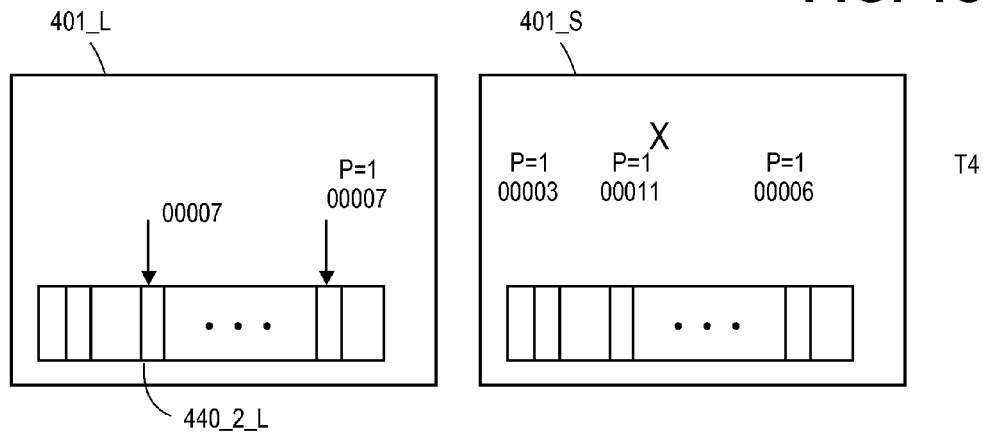

At time T4, as observed in FIG. 4d, the order number of the accessing thread (00007 for thread 410_7) is then compared against the order numbers of each of the resultants 450_1_L/S through 450_N_L/S in both bloom filters 401_L, 401_S. In the case of a lower valued resultant in the load bloom filter 401_L, the (higher) order number of the accessing thread is written back into the data store 403_L over the lesser value. For example, resultant 450_2_L shows an order number of 00002. This value will subsequently be overwritten with a value of 00007 in the corresponding storage location 440_2_L. Any P bits that indicate no previous access to the corresponding storage location have been made (e.g., as indicated by the P bit of resultant 450_N_L) are overwritten to indicate that access has occurred and also written with the order number of the accessing thread.

In the case of where all the resultants 450_1_S through 450_N_S of the store bloom filter 402_1 have higher order number, when all resultant P bits are also equal to 1, a flag or other error condition is raised as it means a younger (out-of-order) store has been performed at the address 401. That is, the current older thread will potentially read incorrect data because a younger thread did not "wait" for the current load operation. As an example, no error will be raised from resultants of 401_S at T4 because only resultant 450_2_S has a higher order number than the accessing thread (i.e., less than all the resultants have higher order number therefore no error flag is raised). Here, if all resultants had a higher order number, it would mean that a younger thread had accessed the memory location.

FIGS. 4a-4d pertained to a load operation by thread 401_7. By contrast, FIGS. 5a-5d pertains to a store operation by thread 501_7.

Figure 5A:
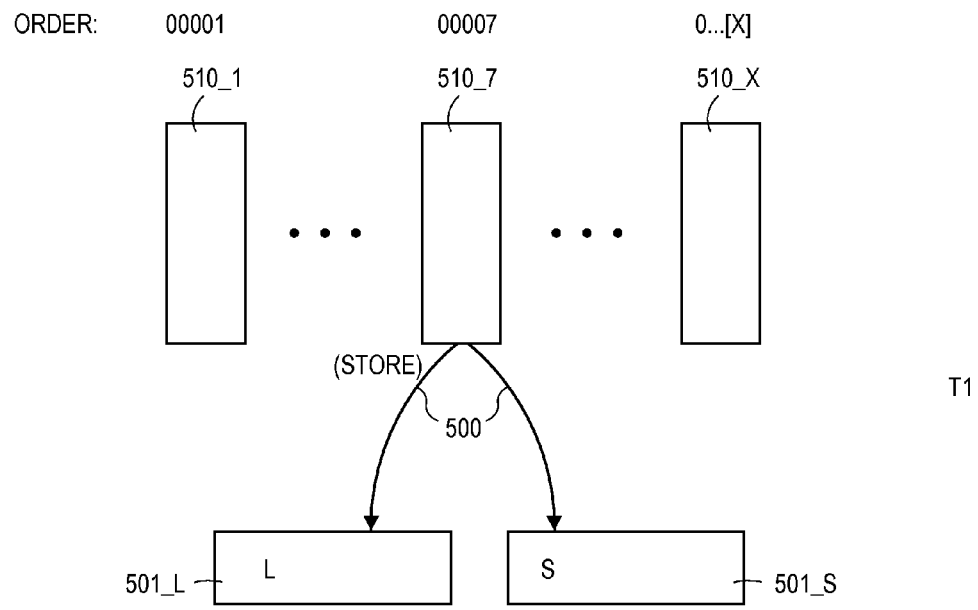
FIGS. 5a through 5d show operation for a store.

At time T1, as observed in FIG. 5a, thread 510_7 attempts a store operation and, as part of the store operation, forwards the address 500 of the store operation to both the load bloom filter 501_L and the store bloom filter 501_S.

Figure 5B:
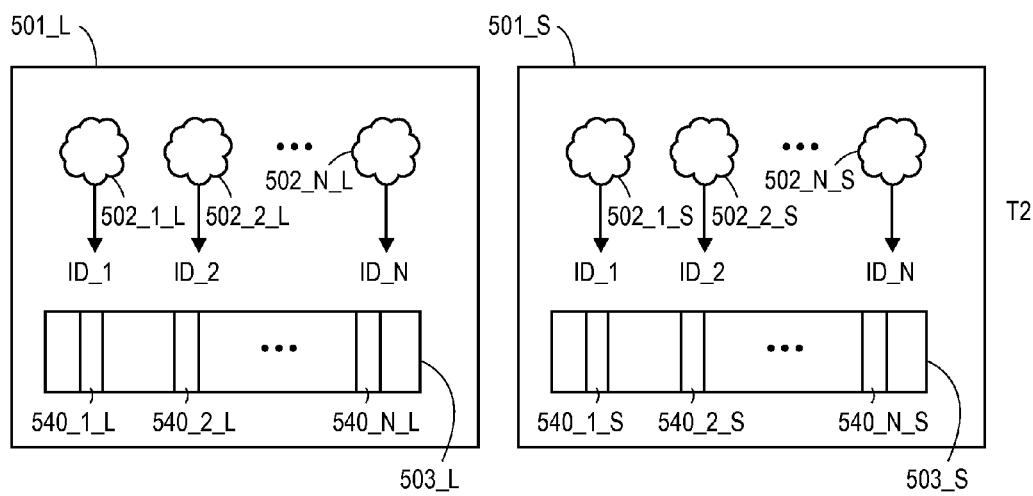
Figure 5C:
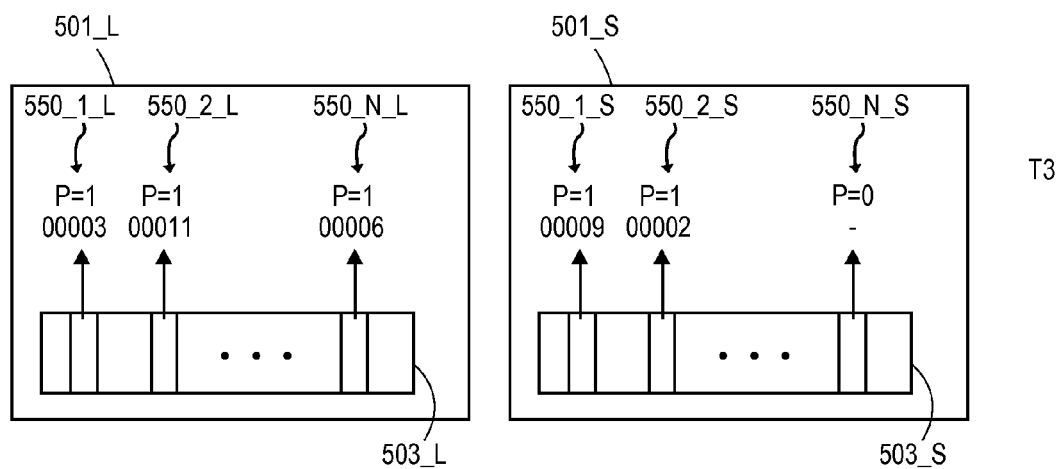

Internal to each bloom filter, at time T2 as observed in FIG. 5b, N hash functions 502_1_L/S through 502_N_L/S are performed on the load address 500. The results of the hash functions correspond to N identifiers of N different storage locations 540_1_L/S, 540_2_L/S, 540_3_L/S, . . . 540_N_L/S within the respective data store 503_L/S of each of the bloom filters 501_L and 501_S.

At time T3, the contents 550_1_L/S through 550_N_L/S of the N different storage locations are read from the respective data stores 503_L/S. As before, the contents are observed to include not only the aforementioned P bit that indicates whether the location has been accessed before, but also, the "order number" of the highest ordered thread that has accessed it if so. Also as before, thread 510_1 is provided order number 00001, thread 510_2 is provided order number 00002, etc.

The P bit of each resultant 550_1_L/S through 550_N_L/S is analyzed to see if any P bits are set to 0. If any P bits of a particular bloom filter are set to zero the memory address has not been presented before at that bloom filter. In that case, an operation of the type represented by the bloom filter has not yet been attempted at the address provided by the accessing thread.

In the present example, note that resultant 550_N_S of the store bloom filter 501_S has a P bit=0 which therefore indicates that a store operation has not yet been performed at memory address 500. By contrast, all P bits in the resultant 550_1_L through 550_N_L of the load bloom filter 501_L are set equal to 1. As such, a load operation has been performed before at address 500.

Figure 5D:
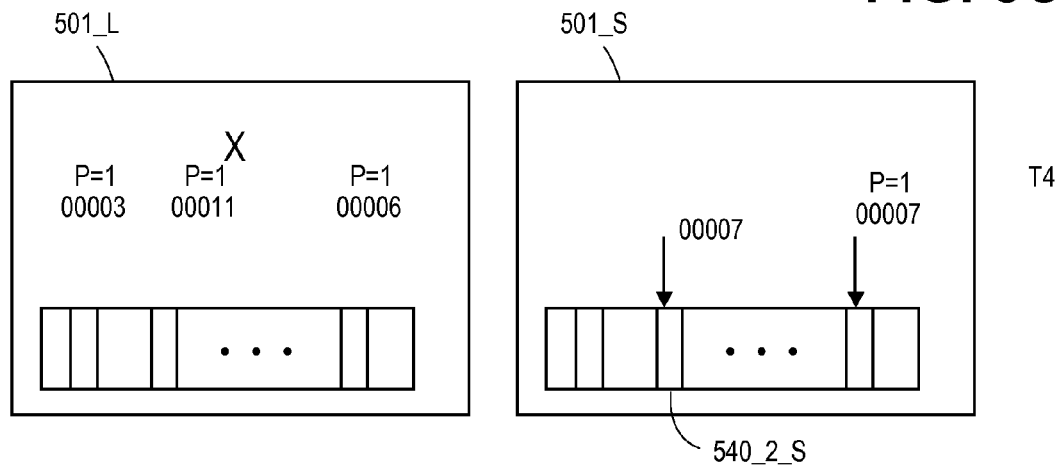

At time T4, referring to FIG. 5d, the order number of the accessing thread (00007 for thread 510_7) is then compared against the order numbers of each of the resultants 550_1_L/S through 550_N_L/S in both bloom filters 501_L, 501_S. In the case of a lower valued resultant in the store bloom filter 501_S, the (higher) order number of the accessing thread is written back into the data store 503_S over the lesser value. For example, resultant 550_2_S shows an order number of 00002. This value will subsequently be overwritten with a value of 00007 in the corresponding storage location. Any P bits that indicate no previous access to the corresponding storage location has been made (e.g., as indicated by the P bit of resultant 550_N_S) are overwritten to indicate that access has occurred.

In the case of higher valued order number in all of the resultants 550_1_L through 550_N_L of the load bloom filter 502_L, when all resultant P bits are also equal to 1, a flag or other error condition is raised as it means a younger (out-of-order) load has been performed at the address 501. That is, a younger thread has loaded potentially incorrect information because it did not "wait for" the current store operation. As observed in FIG. 5d no error flag is raised because not all resultants have higher order numbers.

Figure 6:
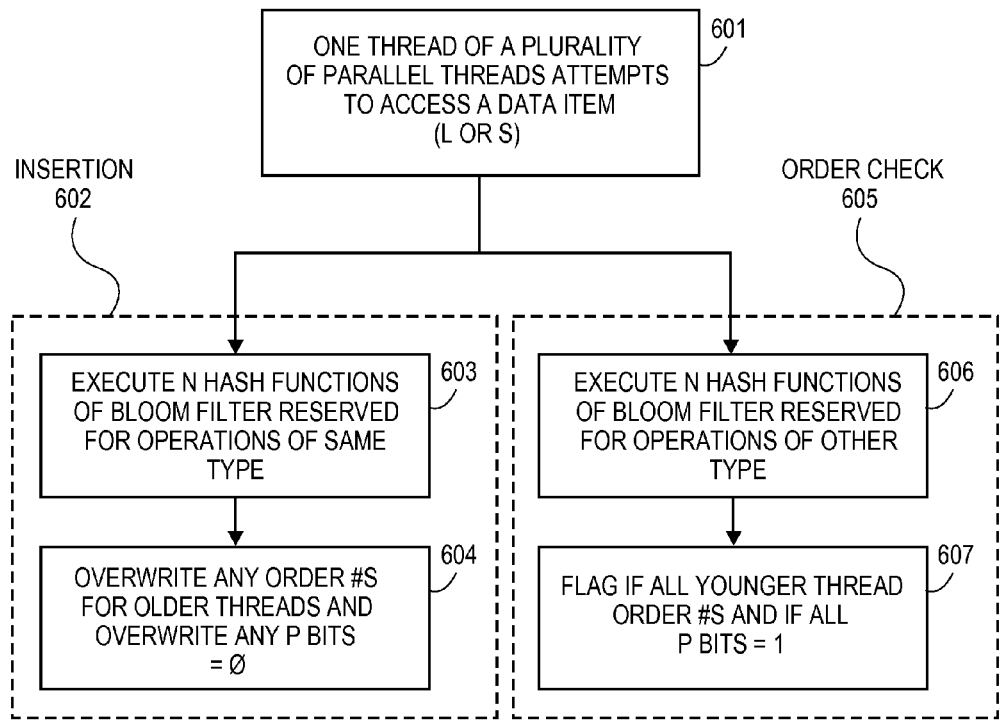
FIG. 6 shows methodology of operation in flow chart form.

FIG. 6 shows a methodology described by the examples of FIGS. 4 and 5. As observed in the process of FIG. 6 one thread of a plurality of parallel threads attempts to access a data item having an address (for either a load or store operation) 601. In an insertion phase 602 of the process, a first bloom filter representing previously accessed addresses by the threads for the same operation (the load bloom filter if a load operation or the store bloom filter if a store operation) is provided with the address and N hash functions are executed 603 to identify N different storage locations. The resultant of each storage location indicates whether it has been accessed before and, if so, the youngest (highest ordered) thread to have done so. The order number of the accessing thread replaces the order number of any older (lower ordered) thread kept in the identified storage locations, and, changes any identified storage element that indicated it had not yet been previously accessed to indicate they it has been accessed 604.

During an order check phase 605, a second bloom filter representing the opposite operation (the store bloom filter if a load operation, or, the load bloom filter if a store operation) is provided with the address and N hash functions are executed 606 to identify N different storage locations. The resultant of each storage location indicates whether it has been accessed before and, if so, the youngest (highest ordered) thread to have done so. If one of the storage locations has not been accessed before the process ends. If all of the storage locations have been accessed before, the respective order numbers provided by the identified storage locations are compared against the order number of the accessing thread 60. If a younger (higher ordered) order number is present in all of these resultants, it signifies that an operation of opposite type has been performed by a younger thread (if a store operation, a load has been performed by a younger thread, or, if a load operation, a store operation has been performed by a younger thread) and a flag or other error signal is raised 607.

Figure 7:
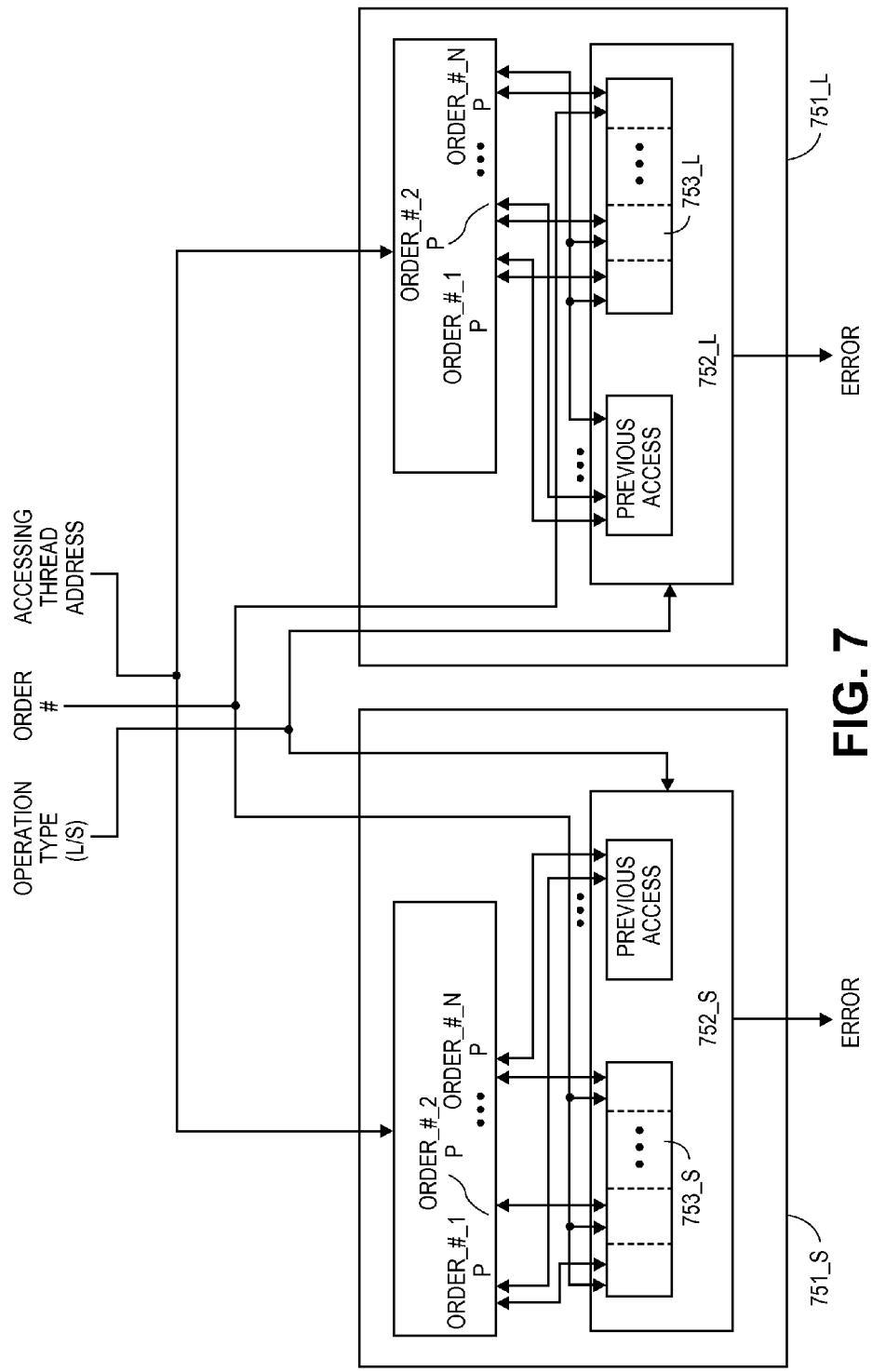
FIG. 7 shows a first circuit embodiment.

FIG. 7 shows a logic design for the above described system. FIG. 7 shows a high level depiction of a, for example, a processor embedded on a semiconductor chip. As observed in FIG. 7 there are is a load address collision detection circuit 751_L and a store address collision detection circuit 751_S. Each circuit receives an operation type, address and an accessing thread order number. The accessing thread order number identifies the thread invoking a particular load or store operation and the address identifies the (e.g., memory) address of the operation being invoked by the accessing thread. Each of the collision detection circuits has its own respective bloom filter circuit 701_L, 701_S. Each bloom filter may be designed as a traditional bloom but having additional bits of storage per storage location to store a P bit and a thread order number.

Upon the presentation of any address, each bloom filter circuit will internally perform N hash functions and return the respective P bit and stored thread order number of N storage locations identified by the N hash functions. Central intelligence logic circuitry 752_L, 752_S receives the respective P bit and order number returned from each of the N storage locations.

Each circuit also has an input to indicate whether the memory access operation is of the same type or of opposite type.

In the case where the operation is of the same type as the collision detection circuit (e.g., the load collision detection circuit receives an order number and address for a load operation), the central intelligence logic circuitry 752_L, 752_S writes back to any P bit indicating that the memory address has not been observed before the opposite information (i.e., that the address has now been observed). The central intelligence logic circuitry also includes a comparator bank_L, 753_S to compare each of the thread order numbers retrieved from the bloom filter against the accessing thread order number presented at the collision detection circuit input. Again, in the case where the operation is of the same type, the central intelligence logic circuitry 752_L, 752_S identifies any stored thread order number returned from the bloom filter that is older than the accessing thread's and overwrites it with the younger accessing thread number.

In the case where the operation is of the opposite type (e.g., the load collision detection circuit receives an address and order number for a store operation), each P bit is received by central intelligence logic circuitry 752_L, 752_S to make a threshold decision as to whether or not the memory address has been observed before. If not no further action is taken. If the P bits indicate the memory address has been observed before, the compactor bank is used to see if the accessing thread order number is older than all of the order numbers returned from the bloom filter circuit. If so an error flag is raised as an output.

Alternative embodiments compared to those discussed above may not use a P bit but instead use a special thread order number "code" to indicate a storage location has not been written to before. For example, noting that the thread order number sequence begins with the value 00001, in an embodiment, the code word 00000 could be used to indicate that the storage location has not been written to before. In this case the separate P bit could be eliminated.

Also, note that insertion process performed by a collision circuit of same operation can be operate wholly or partially in parallel with its sibling collision circuit as it performs the sequence for opposite operation. Said more simply, the load and store address collision circuits 751_L, 751_S can operate wholly or partially in parallel for any load or store memory operation. Also, although the term order "number" has been used at length to more clearly describe the operation of the embodiments described above, it should be clear that the term applies to any value (e.g., alpha-numeric) from which thread ordering can be deduced.

Those of ordinary skill will be able to determine the appropriate number of storage locations and hash functions per bloom filter as a function of the number of parallel threads to support and the size of the memory address space. Although the above described embodiments have indicated that both bloom filters have an equal number of hash functions (N) it is conceivable that the load and store bloom filters may have a different number of hash functions.

Figure 8:
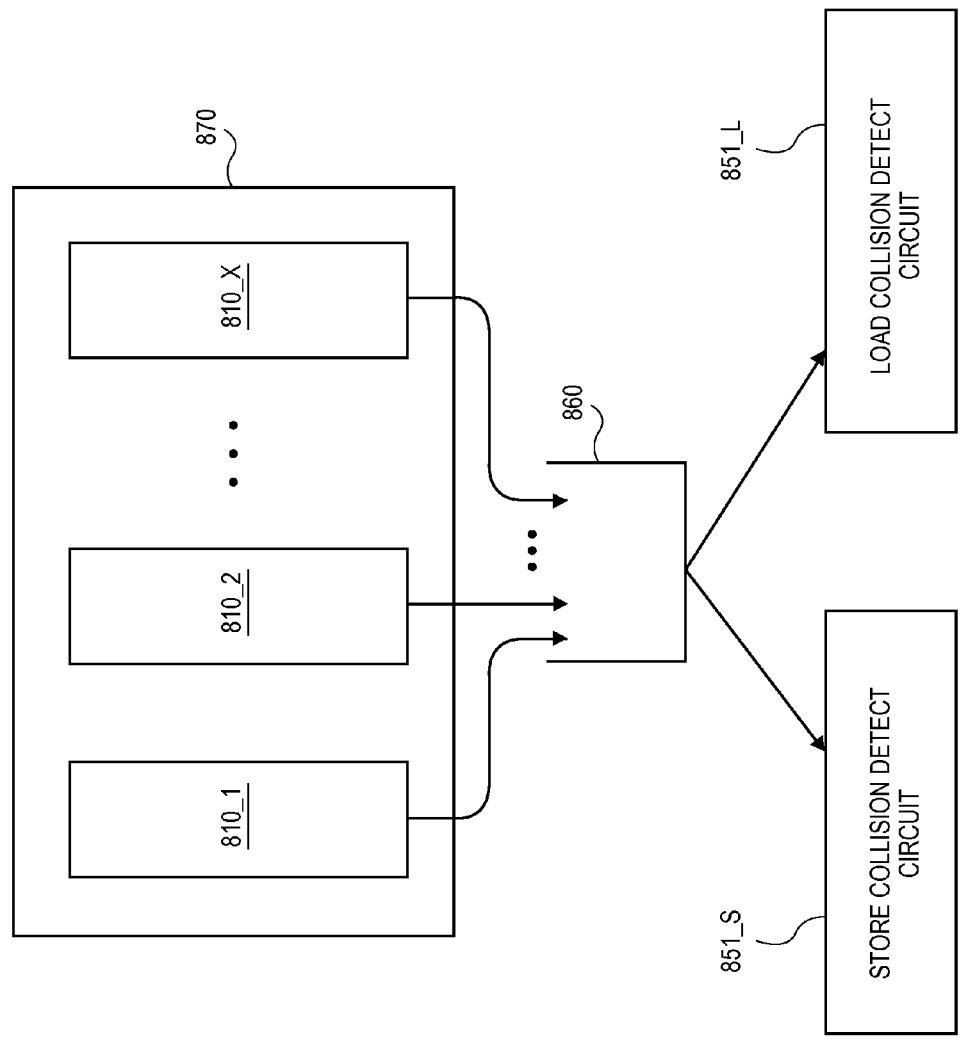
FIG. 8 shows a second circuit embodiment.

FIG. 8 shows one approach where a single load address collision circuit 851_L and a single store collision circuit 851_S are instantiated to support all the parallel threads 810_1 through 810_X of the system. Because the rate at which the parallel threads generate load and store operations may exceed the rate at which the collision circuits 851_L, 851_S can process them, a queue 860 is inserted between the processing unit(s) 870 and the address collision detect circuits 851_L, 851_S. Any processing unit that is executing one of the threads is coupled to the queue 860. A processing unit is a hardware resource used to execute a thread. Examples include a computer, a processor and an instruction execution pipeline. Note that a single instruction execution pipeline can concurrently execute parallel threads by maintaining separate active contexts for each parallel thread.

The queue 860 receives the load and store operations from the one or more processing unit(s) 870 executing the parallel threads and dispatches them to the collision detect circuits 851_L, 851_S when they reach the bottom (head) of the queue. Note that each operation entered into the queue 860 as received from a processing unit and dispatched from the queue 860 to the collision circuits 850_L, 850_S contains some identity of the type of operation (load or store), the address of the operation and the thread order number. In an embodiment, logic circuitry is coupled to the tail (entry point) of the queue to arbitrate multiple simultaneous requests from the parallel threads. Here, the logic circuitry is configured to place requests from older threads ahead of requests from younger threads.

Figure 9:
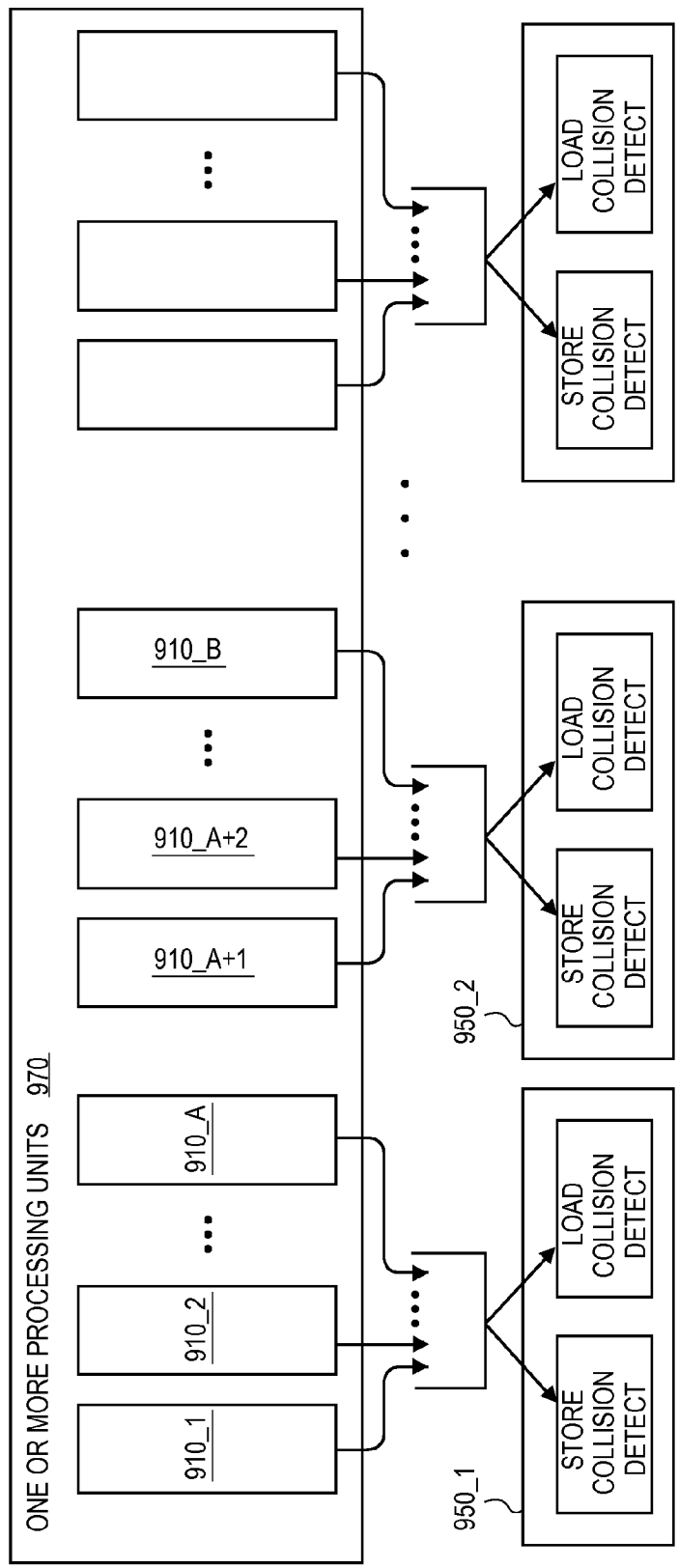
FIG. 9 shows a third circuit embodiment.

FIG. 9 shows another approach where multiple load and store pairs of collision circuits are instantiated to support groups of threads executed by the one or more processing units 970. That is, a first set of load and store collision circuits 950_1 support threads 910_1 through 910_A, a second set of load and store collision circuits 950_2 support threads 910_A+1 through 910_B, etc. Threads Here, there may be, for instance, some guarantee that the threads of the different groups will not collide (e.g., each thread group is partitioned to operate out of different memory address space than the threads of another group). Notably, the thread order number set can be the same across groups (e.g., the oldest thread in each group is given the same order number (e.g., 00001). Here, instantiating multiple collision detection circuit sets can improve performance as compared to a system having one queue to support all parallel threads as discussed above with respect to FIG. 9 above (as in queue holding time is reduced and thread groups can execute in parallel).

Another possible operation mode of the approach of FIG. 9 is to view each group of threads as a "batch" of threads that, upon commitment of all threads in a group, "opens up" the collision circuitry set to support a next batch of threads. For example, when each of threads 910_1 through 910_A finally commit, a next batch of A threads are assigned to load and store collision circuits 950_1. Here, the next batch of A threads may operate out of the same memory address space as threads 910_1 through 910_A. After threads 910_1 through 910_A have committed but before the next batch of threads begin execution the bloom filters of load and store collision circuits 950_1 may be cleared or otherwise void their contents. The same operation as described above may also be applied for the other thread groups/collision circuits observed in FIG. 9.

Note that any of the "circuits", "circuitry" or operations described above can be implemented on a semiconductor chip with dedicated (e.g., custom) logic circuitry designed to perform the specified task(s). The data stores of the bloom circuits may be built with storage cell circuitry such as registers or synchronous random access memory (SRAM) cells. Alternatively, the circuits/circuitry/operations can implemented partially or wholly with circuitry that executes some form of program code such as micro-controller, controller, processing core, etc. As such, some embodiments may be implemented with a machine readable storage medium or media that stores program code that when executed causes some or all of the above described tasks to be performed.

A machine readable medium that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A semiconductor chip comprising:
   first and second inputs to respectively receive an address of a load operation and a store operation of an accessing thread and said accessing thread's order number;
   a load bloom filter circuit coupled to said first input to receive the address of the load operation and a store bloom filter circuit coupled to said second input to receive the address of the store operation, the load bloom filter circuit and the store bloom filter circuit each having storage locations that individually identify whether they have been previously accessed and provide an order number of a previous accessing thread if so; and
   a circuit to:
   for the store operation, record the address of the store operation in a storage location of the store bloom filter circuit and present the address of the store operation to the load bloom filter circuit to determine if any younger thread performed a load from the address, and
   for the load operation, record the address of the load operation in a storage location of the load bloom filter circuit and present the address of the load operation to the store bloom filter circuit to determine if any younger thread performed a store to the address.

2. The semiconductor chip of claim 1 further comprising one or more processing units to execute parallel ordered threads, said accessing thread and any younger accessing threads being members of said parallel ordered threads.

3. The semiconductor chip of claim 2 further comprising a queue between said one or more processing units and the load bloom filter circuit and the store bloom filter circuit.

4. The semiconductor chip of claim 1 wherein the circuit is to generate a flag when:
   for the store operation, if any younger thread performed the load from the address, and for the load operation, if any younger thread performed the store to the address.

\* \* \* \* \*